UNITED STATES PATENT OFFICE.

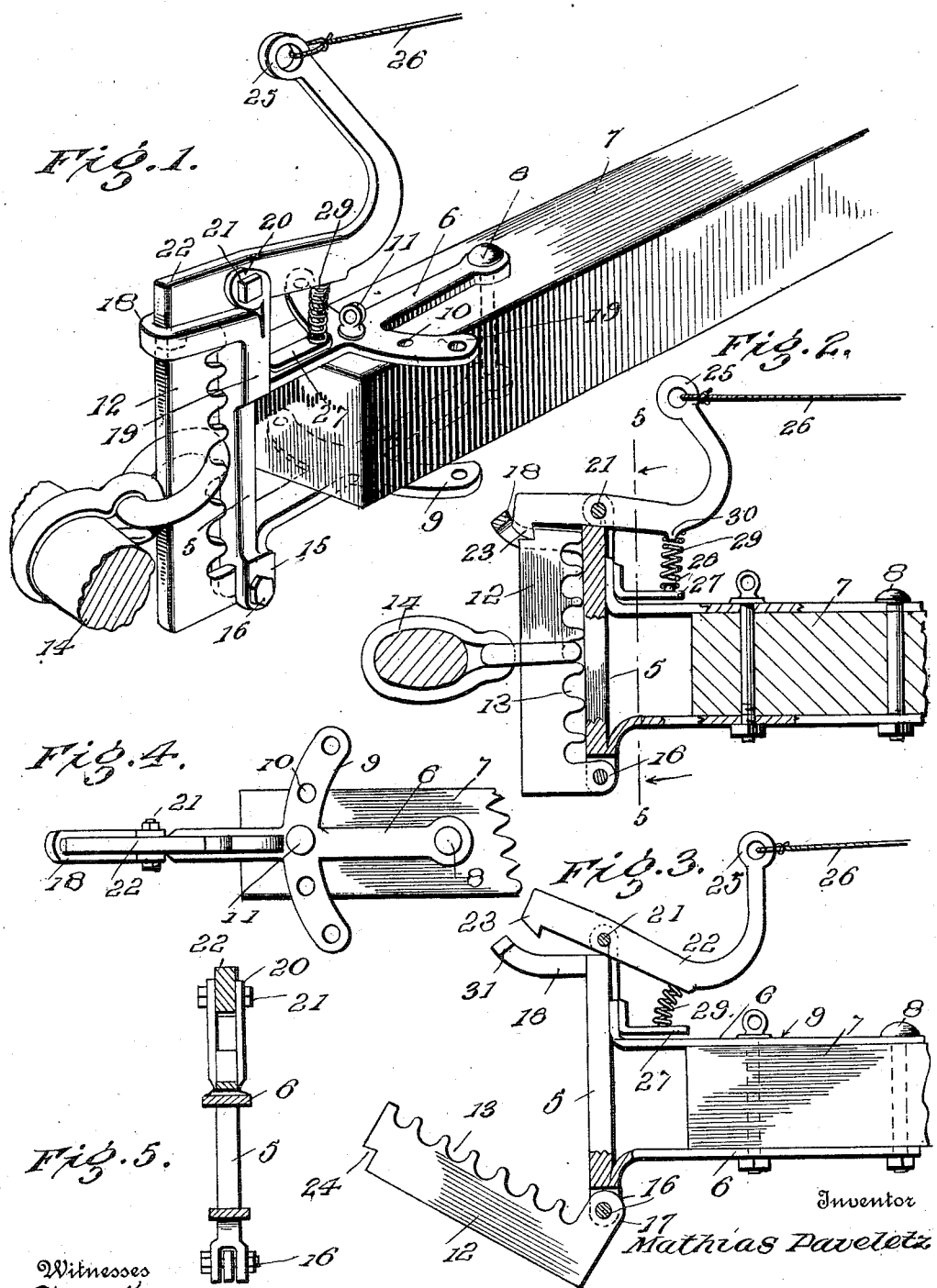

MATHIAS PAVELETZ, OF CANBY, OREGON.

CLEVIS.

994,783.

Specification of Letters Patent. Patented June 13, 1911.

Application filed September 24, 1910. Serial No. 583,698.

*To all whom it may concern:*

Be it known that I, MATHIAS PAVELETZ, a citizen of the United States, residing at Canby, in the county of Clackamas and State of Oregon, have invented certain new and useful Improvements in Clevises, of which the following is a specification.

This invention relates to clevises for plows, cultivators and the like and has for its object the provision of a comparatively simple and thoroughly efficient device of this character, the construction of which is such that a draft animal may be readily detached from a plow in case the animal becomes fractious or attempts to run away.

A further object is to provide a clevis having a draft bar pivotally mounted thereon and normally held in closed or operative position by a spring locking member, means being provided for releasing said locking member when it is desired to detach the draft animal.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawing, in which:

Figure 1 is a perspective view of a clevis constructed in accordance with my invention, showing the same attached to the draft beam of a plow; Fig. 2 is a vertical sectional view of the same, showing the locking member or latch in engagement with the draft bar; Fig. 3 is a similar view, showing the locking member released and the draft bar swung downwardly to inoperative position; Fig. 4 is a top plan view of Fig. 1; Fig. 5 is a vertical transverse sectional view taken on the line 5—5 of Fig. 2 and looking in the direction of the arrow.

Corresponding and like parts are referred to in the following description and indicated in all the views of the drawing by the same reference characters.

The improved clevis forming the subject matter of the present invention comprises an attaching member including a vertical bar or standard 5 having spaced arms 6 extending laterally therefrom for engagement with the opposite longitudinal edges of a draft beam, indicated at 7, and to which they are secured by a bolt or similar fastening device 8.

Secured to or formed integral with the arms 6 are segmental cross bars 9 each having a series of openings 10 formed therein and adapted to receive a pin 11 by means of which the clevis may be adjusted laterally with respect to the draft beam 7 and securely held in adjusted position.

Pivotally mounted on the attaching member 5, is a draft bar 12 having its inner face provided with a series of notches 13 adapted to receive the attaching ring of a whiffletree or similar fastening device, indicated at 14. The lower end of the bar 5 is bifurcated to produce spaced ears 15 between which is pivotally mounted at 16, a lug 17 projecting laterally from the inner longitudinal edge of the draft bar 12 at the lower end thereof, as shown.

Secured to or formed integral with the upper end of the bar 5, is a keeper 18, preferably in the form of a loop, the side walls of which are extended downwardly to form spaced arms 19 defining an intermediate recess for the reception of the end of the adjacent attaching arm 6. The metal constituting the body of the keeper 18 is cut or severed at the arms 19 and thence extended upwardly and coiled upon itself to produce oppositely disposed eyes 20 between which is pivotally mounted at 21, a locking member 22. The locking member 22 is preferably in the form of a lever, one end of which extends within the keeper 18 and is provided with a terminal tooth 23, the inner face of which is inclined or beveled for engagement with the correspondingly inclined wall 24 of a notch or recess formed in the upper end of the draft bar 12, thus to hold the draft bar in closed or elevated position under ordinary conditions. The other end of the locking member or lever 22 is bent upwardly and provided with a terminal eye 25 to which is attached one end of a cord, cable or other flexible element 26, the opposite end of which is extended to the handles of a plow or to a position within convenient reach of the operator's seat when the clevis is used in connection with a cultivator, harrow or similar implement, so that by exerting a longitudinal pull on the cable 26, the draft bar 12 may be swung downwardly to permit the release of the draft animal.

Interposed between the arms 19 and secured in any suitable manner to the end of the adjacent attaching arm 6, is one end of a short bar 27, the opposite end of which is spaced from the upper surface of the arm 6 and provided with an upstanding boss 28 over which passes the lower convolution of a coil spring 29, the upper convolution of said spring engaging a similar boss 30 depending from the locking member or lever 22, as best shown in Fig. 2 of the drawing. The spring 29 serves to normally and yieldably hold the tooth 23 of the locking member in engagement with the draft bar 12, while the free end of the bar 27, being normally spaced from the attaching arm 6, forms in effect a yieldable support for the lower end of the spring, thereby to assist in retaining the locking member in engagement with said draft bar.

Attention is here called to the fact that the outer or closed end of the loop or keeper 18 is inclined or beveled at 31 so as to permit the draft bar 12 to be swung upwardly to closed position without binding or wedging action between the parts. Thus it will be seen that under ordinary conditions the pull of the draft animal will be exerted on the bar 12. Should the draft animal become unruly or attempt to run away however, said animal may be readily detached from the plow and cultivator, by merely exerting a longitudinal pull on the cable 26 which releases the tooth 23 of the locking member from engagement with the draft bar, thus permitting said bar to swing downwardly to the position shown in Fig. 3 of the drawing, as will be readily understood.

If desired the bar 27 may be dispensed with and the spring 29 interposed between the stud 30 and a similar stud on the adjacent attaching arm of the clevis, without departing from the spirit of the invention.

Having thus described the invention, what is claimed as new is:

1. A clevis including an attaching member, a substantially U-shaped keeper carried by the attaching member, a draft bar pivotally mounted on said attaching member and movable to operative position within the keeper, and a locking member extending within said keeper and engaging the free end of said draft bar.

2. A clevis including spaced attaching members for engagement with a draft device, a substantially U-shaped keeper carried by the attaching members, a draft bar pivotally mounted on said attaching members and movable to closed position within the keeper, a locking member extending within the keeper and engaging the draft bar, and means for tilting the locking member, thereby to permit the draft bar to swing downwardly to open position.

3. A clevis including a standard having spaced attaching arms secured thereto for engagement with a draft device, a keeper secured to the standard, a draft bar pivotally mounted on the lower end of the standard and movable to closed position within the keeper, a locking member pivotally mounted on the keeper and adapted to engage the draft bar, a spring interposed between the locking member and one of the attaching arms, and means operatively connected with the locking member for disengaging the latter from the draft bar.

4. A clevis including a standard having its lower end bifurcated and provided with laterally extending arms for engagement with a draft device, a keeper secured to the standard and provided with spaced eyes, a draft bar pivotally mounted in the bifurcated portion of the standard, a locking device pivotally mounted between said eyes and adapted to engage the draft bar for holding said bar in closed position, and means for disengaging the locking device from the draft bar, thereby to permit the latter to move downwardly to open position.

5. A clevis including a standard having means for attachment to a draft device, a keeper secured to the standard and provided with spaced upstanding eyes, a draft bar pivotally mounted on the standard and having its free end provided with a notch, a locking member pivotally mounted between said eyes and having one end thereof provided with a depending tooth adapted to engage the notch, and means operatively connected with the other end of the locking member for releasing said locking member, thereby to permit the draft bar to move downwardly to open position.

6. A clevis including a standard having means for attachment to a draft device, a bar extending laterally from one side of the standard and provided with a boss, a draft bar pivotally mounted on the lower end of the standard, a keeper secured to the standard and provided with spaced upstanding eyes, a locking member pivotally mounted between said eyes and adapted to engage the upper end of the draft bar, said locking member having one end thereof bent upwardly and provided with an eye and its lower longitudinal edge formed with a depending boss, a coil spring interposed between the boss on the locking member and the boss on said bar, and means engaging the eye of the locking member for releasing the latter from engagement with the draft bar.

7. A clevis including a support having its lower end bifurcated and provided with spaced attaching arms for engagement with a draft device, a keeper having spaced bars secured to the opposite sides of the standard and defining an intermediate chamber, the front of the keeper being inclined upwardly and the arms of said keeper being provided with spaced upstanding eyes, a bar seated in said chamber and provided with an upstanding boss, a locking member pivotally mounted between the eyes, a draft bar pivotally mounted in the bifurcated end of the standard and held in closed position by engagement with the locking member, a spring interposed between the boss and the lower edge of the locking member, and means operatively connected with said locking member for releasing the latter, thereby to permit the draft bar to swing downwardly to open position.

In testimony whereof, I affix my signature in presence of two witnesses.

MATHIAS PAVELETZ. [L. S.]

Witnesses:
F. G. BUCHANAN,
WILLIAM KNIGHT.

---

Copies of this patent may be obtained for five cents each, by addressing the "Commissioner of Patents, Washington, D. C."